US007907290B2

(12) United States Patent
Mindler et al.

(10) Patent No.: US 7,907,290 B2
(45) Date of Patent: Mar. 15, 2011

(54) PRINTER WITH VARIABLE LEAD ADVANCE

(75) Inventors: Robert F. Mindler, Churchville, NY (US); David E. Coons, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 1481 days.

(21) Appl. No.: 11/317,922

(22) Filed: Dec. 23, 2005

(65) Prior Publication Data

US 2007/0146755 A1 Jun. 28, 2007

(51) Int. Cl.
*G06K 15/00* (2006.01)

(52) U.S. Cl. ........................................................ 358/1.12

(58) Field of Classification Search ......................... None
See application file for complete search history.

(56) References Cited

U.S. PATENT DOCUMENTS

| | | | | |
|---|---|---|---|---|
| 5,839,939 | A | 11/1998 | Ohi | |
| 6,229,983 | B1 * | 5/2001 | Sawada | 399/385 |
| 7,249,903 | B2 * | 7/2007 | Shaw, III | 400/621 |
| 2004/0163511 | A1 | 8/2004 | Shinga | |

FOREIGN PATENT DOCUMENTS

| | | |
|---|---|---|
| EP | 0 960 819 | 12/1999 |
| EP | 1 479 526 | 11/2004 |
| EP | 1 552 949 | 7/2005 |
| JP | 2001-130808 | 5/2001 |

* cited by examiner

*Primary Examiner* — David K Moore
*Assistant Examiner* — Marcus T Riley
(74) *Attorney, Agent, or Firm* — Roland R. Schindler, II; David A. Novais; Eugene I. Shkurko

(57) ABSTRACT

A printer and method for operating a printer are provided that prints using a receiver medium having a rolled portion with an outermost layer from which an unrolled portion extends to a print engine. The method comprises: sensing a condition indicating the receiver medium may have been contacted by other than a component of the printer or by a donor material applied by the print engine; measuring an aspect of the receiver medium indicative of the circumferential length of the outermost layer; determining a circumferential length of the receiver medium based upon the measured aspect of the rolled portion of the receiver medium; determining an exclusion length of the receiver medium based upon the determined circumferential length and a travel distance that is a representation of a length of the unrolled portion between the rolled portion and the print engine; and automatically advancing the receiver medium by the exclusion length.

17 Claims, 14 Drawing Sheets

PRINTER WITH VARIABLE LEAD ADVANCE

FIELD OF THE INVENTION

The invention relates to the field of printers that use rolled receiver medium.

BACKGROUND OF THE INVENTION

A wide variety of printers record images on receiver medium such as paper, fabrics, or films that are specially treated at least one side in order to facilitate the formation of images thereon or to provide enhanced stability of an image printer thereon. In some of these printers, such receiver mediums are provided in roll form with the receiver medium being rolled with the treated side facing outward. This arrangement enables the components of a printer that uses such a rolled receiver medium to be arranged in relatively compact form factor. However, this creates a risk that the specially treated side will be brought into contact with the hands of an operator when manipulation of the receiver medium is necessary, such as to load receiver medium or to clear jams. Further, it will be appreciated that during loading of the receiver medium or at various times during the use of such a rolled receiver medium, there exists a risk that contaminants will be released and will contact the specially treated surface of the receiver medium. Such manual or contaminant contact can have deleterious effects on the receiver medium, including but not limited to altering the distribution or concentration of treated materials on the treated surface, introducing contaminates on the treated side or by compressing, reshaping, stretching, creasing, or tearing the receiver medium.

Where contact causes such deleterious effects it can be difficult to provide a printed image having an appropriate appearance using the affected receiver medium. Further, where a receiver medium that is torn, stretched, or contaminated as a result of contact, the use of such receiver medium can seriously interrupt the use of the printer by contaminating a series of subsequent printing operations or by ripping, tearing or otherwise failing in a manner that interferes with the flow of receiver medium through the printer or with other operations of the printer.

One possible approach to addressing this problem is to use special packaging materials to package rolled medium so that a user can load a rolled medium, without directly touching the medium. For example, U.S. Pat. No. 5,839,839, entitled "INK FILM REFILL FOR HEAT-TRANSFER PRINTER" filed on Jan. 31, 1997 by Brot et al. describes a removable wrapping that is applied around a rolled donor medium at the time of manufacture. This wrapping is shaped and positioned so that it covers areas of the receiver medium that are likely to be contacted during loading. In some instances, the wrapping contains printed instructions that illustrate or describe a loading process that a user is to use that will only require manipulation of the wrapped portion of the receiver medium. After loading, the wrapping is discarded.

However, it will be appreciated that this approach merely provides protection for the rolled medium during an initial loading process. However, this does not protect the receiver medium against deleterious effects caused by manual or contaminant contact with the receiver medium at any time after the receiver medium is loaded. For example, the approach of the '839 patent is ineffectual when it may be necessary or desirable for a user to remove and reload rolled medium such as to clear paper jams or to switch from one type of receiver medium to another type receiver medium. Similarly, the approach of the '839 patent does not protect the rolled medium from contamination that contact can occur after loading of the rolled medium.

Another approach has been to preprogram printers that use rolled receiver medium to discard a predetermined length of such receiver medium upon loading. One example of a prior art printer 10 of this type is illustrated in FIG. 1. As is illustrated in FIG. 1, when an unused roll 14*a* of receiver medium 12 is loaded, prior art printer 10 advances receiver medium 12 by a predetermined length. In this illustration, the predetermined length is equivalent to six printable image frames 16*a*-16*f*. Typically, this predetermined length is intended to be long enough so that when unused roll 14*a* of receiver medium 12 is loaded into prior art printer 10, a length equal to an entire circumferential length of unused roll 14*a* of receiver medium 12 is discarded. This approach avoids the use of potentially contacted receiver medium 12 by discarding an outermost layer of receiver medium 12 and allowing use of other layers that were effectively wrapped by the outermost layer at the time of the potential contact.

While this approach is useful and simple to implement, it can be wasteful when a used roll 14*b* of receiver medium is reloaded into prior art printer 10 as may occur during printer maintenance or as may occur when a user wishes to use different types of receiver medium.

FIG. 2 illustrates an example of how this waste can occur. As illustrated in FIG. 2, used roll 14*b* of receiver medium 12 has a circumference 18*b*, that is substantially smaller than the circumference 18*a* of the unused roll 14*a* of receiver medium 12. The length of receiver medium 12 that may be subject to contact during loading or reloading is smaller than the length of receiver medium 12 that may be subject to contact if an unused roll 14*a* of receiver medium 12 had been located in printer 20. However, the prior art printer 10 discards the same length L of receiver medium 12, including in this example, six image frames 16*a*-16*f*. Thus, such a prior art printer 10 discards excess receiver medium. In printers such as thermal printers where donor ribbon and receiver medium are sold in matched combinations, this can cause user of the prior art printer 10 to have an apparent excess of donor ribbon after receiver medium 12 is exhausted. This can lead such users to assume that they have not been provided with the appropriate amounts of receiver medium 12, which in turn, can lead to user dissatisfaction.

What is needed therefore is a method for operating a printer that minimizes the potential risks imposed by the use of receiver medium that has potentially been compromised through manual or contaminant contacts.

SUMMARY OF THE INVENTION

In one aspect of the invention, a method for operating a printer that prints using a receiver medium having a rolled portion with layers of rolled receiver medium leading to an outermost layer from which an unrolled portion of the receiver medium extends to a print engine. The method comprises the steps of: sensing a condition indicating the receiver medium may have been contacted by other than a component of the printer or by a donor material applied by the print engine; measuring an aspect of the receiver medium indicative of the circumferential length of the outermost layer; determining a circumferential length of the receiver medium based upon the measured aspect of the rolled portion of the receiver medium; determining an exclusion length of the receiver medium based upon the determined circumferential length and a travel distance that is a representation of a length of the unrolled portion between the rolled portion and the print engine; and automatically advancing the receiver medium by the exclusion length so that a subsequent printed image by the printer will be printed using a portion of the receiver medium that was not directly subject to the possibility of such contact.

In another aspect of the invention, a printer is provided. The printer comprises: a medium advance including a roll receiving area for receiving a rolled portion of a receiver medium having a preferred side for use in recording images during printing with the receiver medium being rolled so that the preferred side faces outward of the roll, the medium advance having a motorized system for advancing an unrolled portion of the receiver medium away from the rolled portion of the receiver medium to a print engine that is adapted to use the preferred side for recording images; a sensor system having a receiver medium sensor located at the roll receiving area and adapted to provide signals from which a processor can determine a circumferential length of the rolled portion of the receiver medium; the sensor system further having a condition sensor adapted to detect at least one condition that can be used to determine when a possibility exists that the preferred side of the receiver medium has been in contact with something other than a component of the printer or a donor material applied by the print engine, the condition sensor generating a signal from which the possibility of such contact can be determined. A processor is operatively connected to the medium advance, the print engine, the receiver medium sensor, and the detector system. The processor is adapted to determine from the signal that a possibility exists that the preferred side of the receiver has been in contact with something other than a component of the printer or a donor medium applied by the print engine. When such a condition is detected, the processor further is operable to determine a circumferential length based upon signals received from the receiver medium sensor to select an exclusion length of receiver medium based upon the determined circumferential length and a length representing a length of the unrolled portion; and to cause the medium advance to advance the receiver medium by at least the exclusion length so that portions of the receiver medium that have potentially been contacted, are not used for printing; wherein the selected non-printing length is proportional to the measured aspect of the receiver medium.

In still another aspect of the invention, a printer is provided. The printer comprises: a medium advance including a roll receiving area for receiving a rolled portion of a receiver medium having a preferred side for use in recording images during printing and a receiver medium path leading to a print engine, the receiver medium being rolled so that the preferred side faces outward of the spool, the medium advance having a motorized system for advancing an unrolled portion of the receiver medium away from the rolled portion to a print engine that is adapted to use the preferred side for recording images; a sensor system having a receiver medium sensor located at the roll receiving area and adapted to provide signals from which a processor can determine a circumferential length of the rolled portion of the receiver medium currently rolled onto the loaded spool and a condition sensor adapted to detect at least one condition indicating that a possibility exists that the exposed side of the receiver medium has been in contact other than with a component of the printer or print engine applied donor material, the sensor generating a signal from which a processor can determine the existence of such a possibility of contact. A processor is operatively connected to the medium advance, the sensor system, and the print engine. The processor is adapted to determine when a condition exists suggesting that the receiver medium may have been contacted and, when such a condition is detected, the processor further being operable to determine a circumferential length of the rolled portion based upon signals received from the receiver medium sensor to select an exclusion length of receiver medium based upon the assigned circumferential length designation; and to cause the medium advance to advance the receiver medium in a manner that excludes from printing a length of the receiver medium beginning at a start point of the receiver medium to extending at least by the exclusion length of the receiver medium; wherein the selected exclusion length is proportional to the measured aspect of the receiver medium.

DETAILED DESCRIPTION OF THE INVENTION

Figure 1:
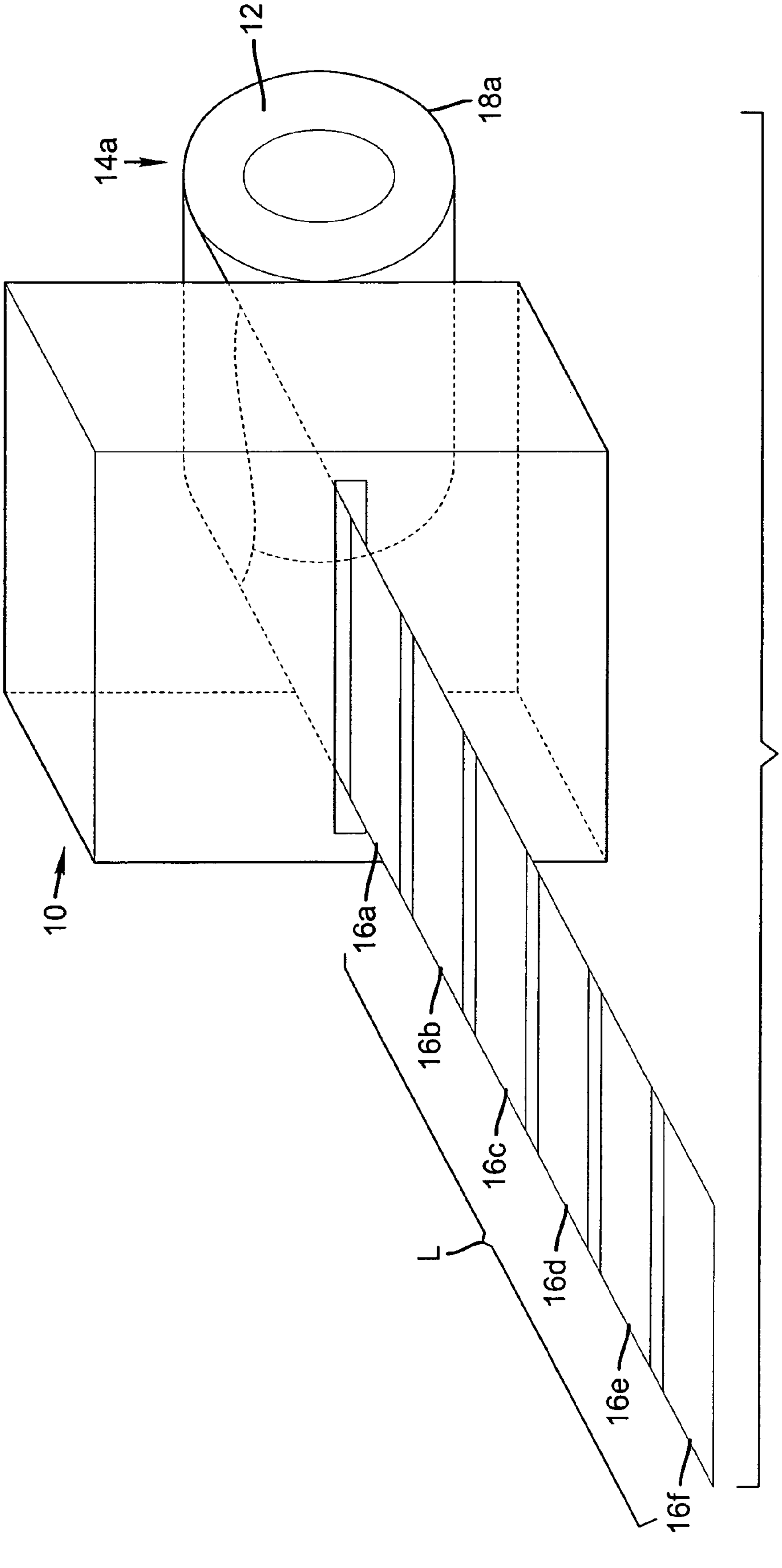
FIG. 1 PRIOR ART
FIG. 1 illustrates a prior art printer with an unused roll of receiver medium advanced in accordance with the prior art.
Figure 2:
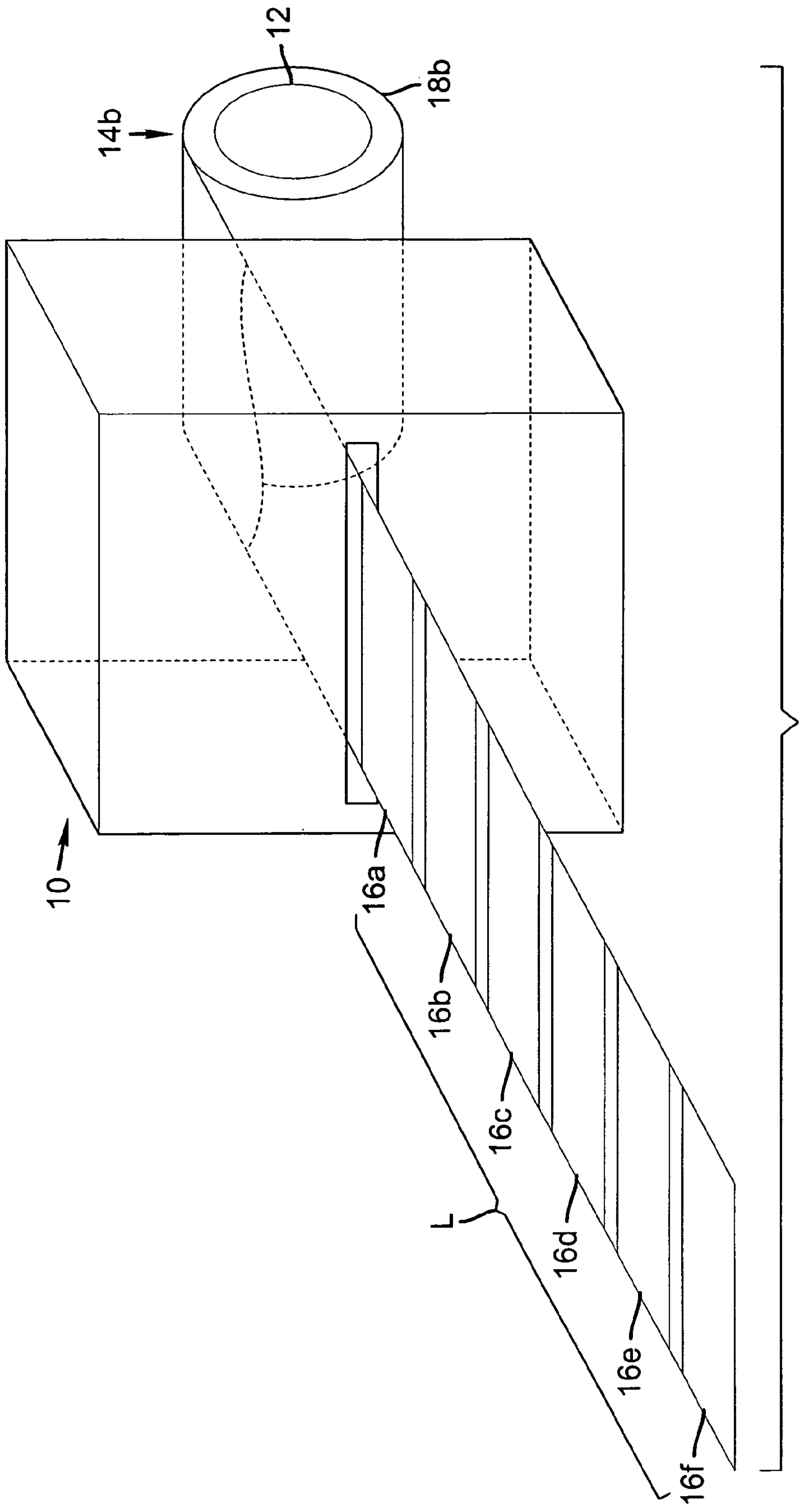
FIG. 2 PRIOR ART
FIG. 2 illustrates a prior art printer with a used roll of receiver medium advanced in accordance with the prior art.
Figure 3:
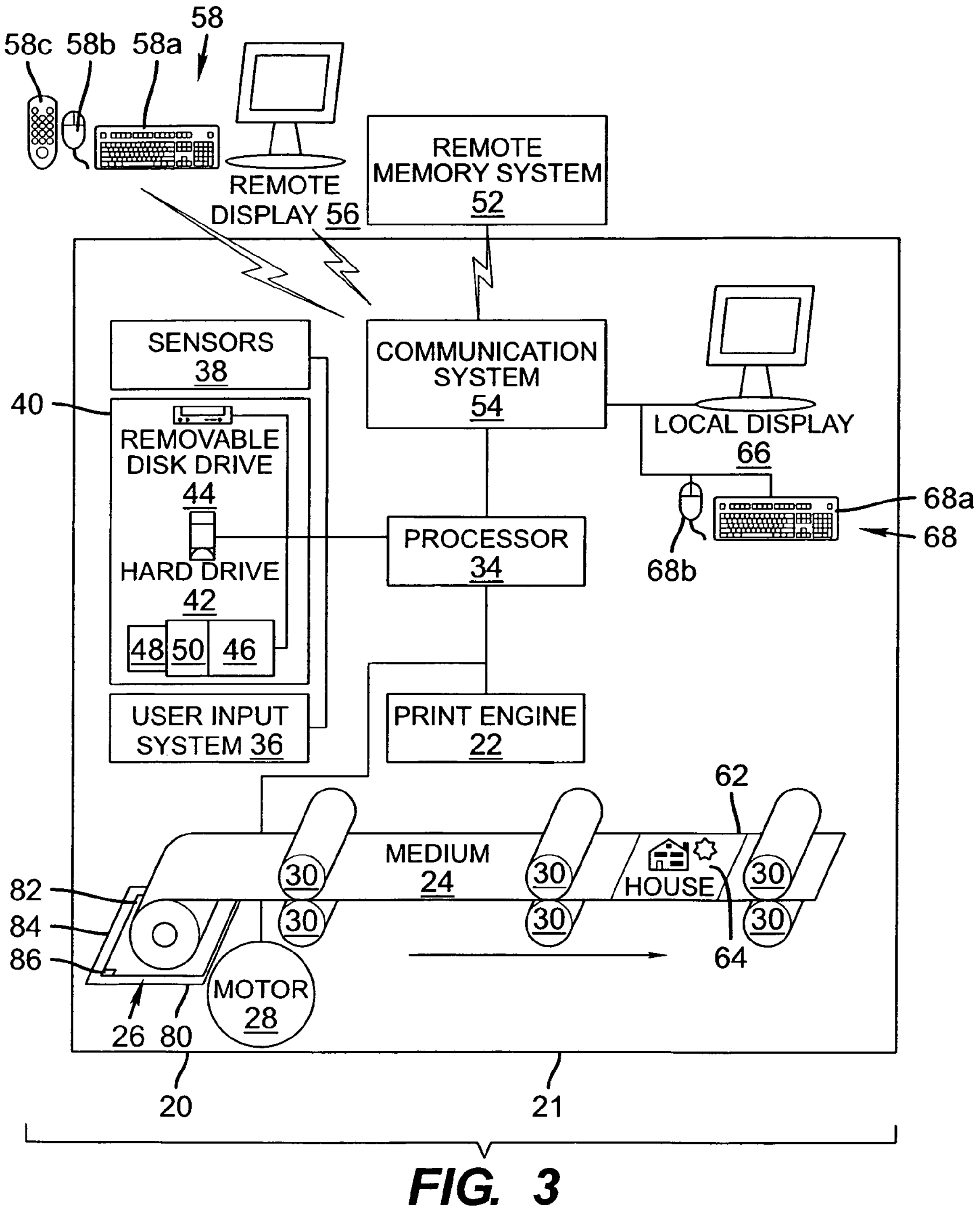
FIG. 3 shows one embodiment of a printer.

FIG. 3 shows one embodiment of a printer 20. In the embodiment of FIG. 1, printer 20 comprises a housing 21 having a print engine 22 that applies markings or otherwise forms an image on a receiver medium 24. Print engine 22 can record images on receiver medium 24 using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology, drop on demand ink jet technology and continuous inkjet technology. For the purpose of the following discussions, print engine 22 will be described as being of a type that generates color images. However, it will be appreciated that this is not necessary and that the claimed methods and apparatuses herein can be practiced with a print engine 22, monotone images such as black and white, grayscale or sepia toned images.

A medium advance 26 is used to position a receiver medium 24 and/or print engine 22 relative to each other to facilitate recording of an image 64 on receiver medium 24. Medium advance 26 can comprise any number of well-known systems for moving receiver medium 24 within printer 20, including motor 28, driving pinch rollers 30, a motorized platen roller (not shown) or other well-known systems for the movement of paper or other types of receiver medium 24. Typically medium advance 26 positions receiver medium 24 and or print engine 22 such that print engine 22 can print an image 64 in an image frame **62*a*-62*g* on receiver medium. Image frame 62*a*-62*g* typically represents a maximum image size that print engine 22 can print on receiver medium 24** without advancing the same.

Print engine 22, medium advance 26 and color sensing system 60 are operated by a processor 34. Processor 34 can include, but is not limited to, a programmable digital computer, a personal computer system, a programmable microprocessor, a programmable logic processor, a series of electronic circuits, a series of electronic circuits reduced to the form of an integrated circuit, or a series of discrete components. Processor 34 can be a single unit or a combination of separate processing units connected by a communication link. Certain functions of processor 34 described herein may be performed by a portion of a processor 34 that is within housing 21, while other portions can be performed by a portion of processor 34 that is exterior to housing such as, for example, a personal computer that is connected to printer 20 by way of a wired or wireless connection. Processor 34 operates printer 20 based upon input signals from a user input system 36, sensors 38, a memory 40 and a communication system 54.

User input system 36 can comprise any form of transducer or other device capable of receiving an input from a user and converting this input into a form that can be used by processor 34. For example, user input system 36 can comprise a touch screen input, a keyboard, a keypad, a mouse, a touch pad input, a 4-way switch, a 6-way switch, an 8-way switch, a stylus system, a trackball system, a joystick system, a voice recognition system, a gesture recognition system or other such systems.

Sensors 38 are optional and can include light sensors and other sensors known in the art that can be used to detect conditions in the environment surrounding image 32 and to convert this information into a form that can be used by processor 34 in governing operation of print engine 22, medium advance 26 and/or other systems of printer 20. Sensors 38 can include audio sensors adapted to capture sounds. Sensors 38 can also include positioning and other sensors used internally to control printer operations.

Memory 40 can include conventional memory devices including solid state, magnetic, optical or other data storage devices. Memory 40 can be fixed within printer 20 or it can be removable. In the embodiment of FIG. 1, printer 20 is shown having a hard drive 42, a disk drive 44 for a removable disk such as an optical, magnetic or other disk memory (not shown) and a memory card slot 46 that holds a removable memory 48 such as a removable memory card and has a memory interface 50 for communicating with removable memory 48.

In the embodiment shown in FIG. 3, printer 20 has a communication system 54 for communicating with a remote memory system 52, a remote display 56, and a remote input 58, such as a remote keyboard 58*a*, a remote mouse 58*b* or a remote control 58*c* and, optionally with a local display 66, and/or a local input 68. Communication system 54 can be for example, an optical, radio frequency or transducer circuit or other system that converts image and other data into a form that can be conveyed to a remote device such as remote memory system 52 or remote display 56 by way of an optical signal, radio frequency signal or other form of signal. Communication system 54 can also be used to receive a digital image and other information from a host computer or network (not shown). In this way, data including, but not limited to, control programs, digital images and metadata can also be stored in remote memory system 52 that is external to printer 20 such as a personal computer server, computer network or other digital data storage system. Communication system 54 provides processor 34 with information and instructions from signals received thereby.

In the embodiment illustrated, local display 66 communicates with processor 34 without involvement of communication system 54. Similarly, local input 68 comprising a local keyboard 68*a* and a local mouse 68*b* also communicates with processor 34 without involvement of communication system 54. However, in other embodiments such communication can be made by way of communication system 54 if desired.

Figure 4:
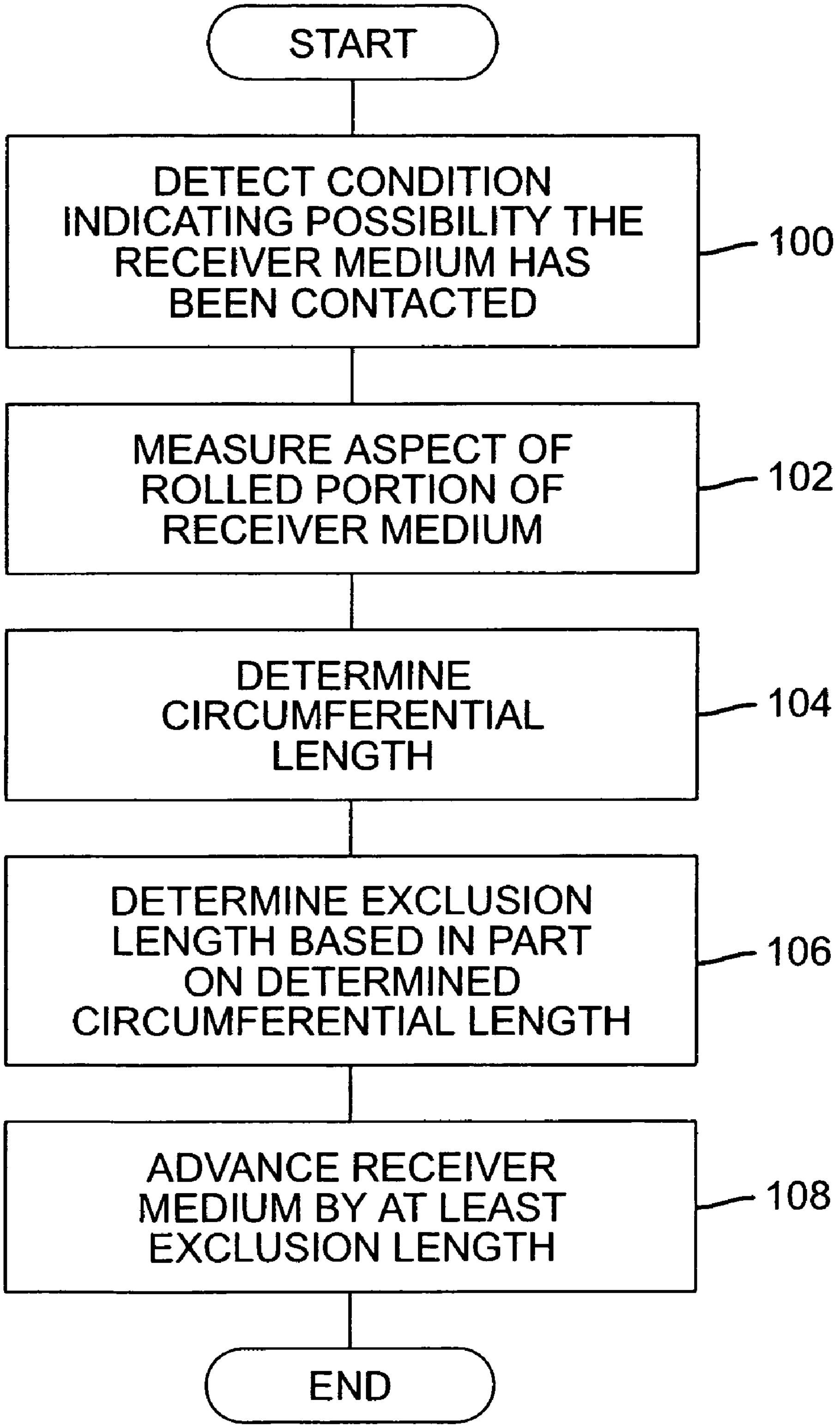
FIG. 4 shows one embodiment of a method for operating a printer.

Turning now to FIGS. 3 and 4, what is shown, respectively, is one embodiment of a printer and a method for operating a printer. In a first step of this method, processor 34 detects a signal from one of sensors 38 from which processor 34 can determine the existence of a condition indicating that a receiver medium 24 in printer 20 may have been contacted by something other than a component of printer 20 or a donor material applied to a print engine (step 100). There are a variety of ways in which processor 34 can do this. In one embodiment, the condition indicating that a receiver medium 24 in printer 20 may have been contacted comprises a condition that indicates that a storage area for a receiver medium 24 has been accessed. For example, in the embodiment illustrated in FIG. 3, a receiver medium storage area 80 comprises a receiver medium storage area 80 comprising in this embodiment an enclosure with an enclosure area 82, a door 84, and a door sensor 86 that is positioned proximate to opening and adapted to detect when the door 84 is opened. In this embodiment, receiver medium storage area 80 is arranged so that access to a rolled portion 72 of receiver medium 24 requires opening door 84 in a manner that can be sensed by door sensor 86. Such a door sensor 86 can comprise, for example, an optical or mechanical or so-called Hall effect switch that is positioned by door 84 to detect movement thereof and which can generate a signal from which processor 34 can determine that door 84 has been opened. When processor 34 determines that door 84 has been opened, processor 34 can determine that a condition exists that indicates that the receiver medium 24 may have been contacted by something other than a component of the printer or a donor material applied by printer engine 22.

Figure 5:
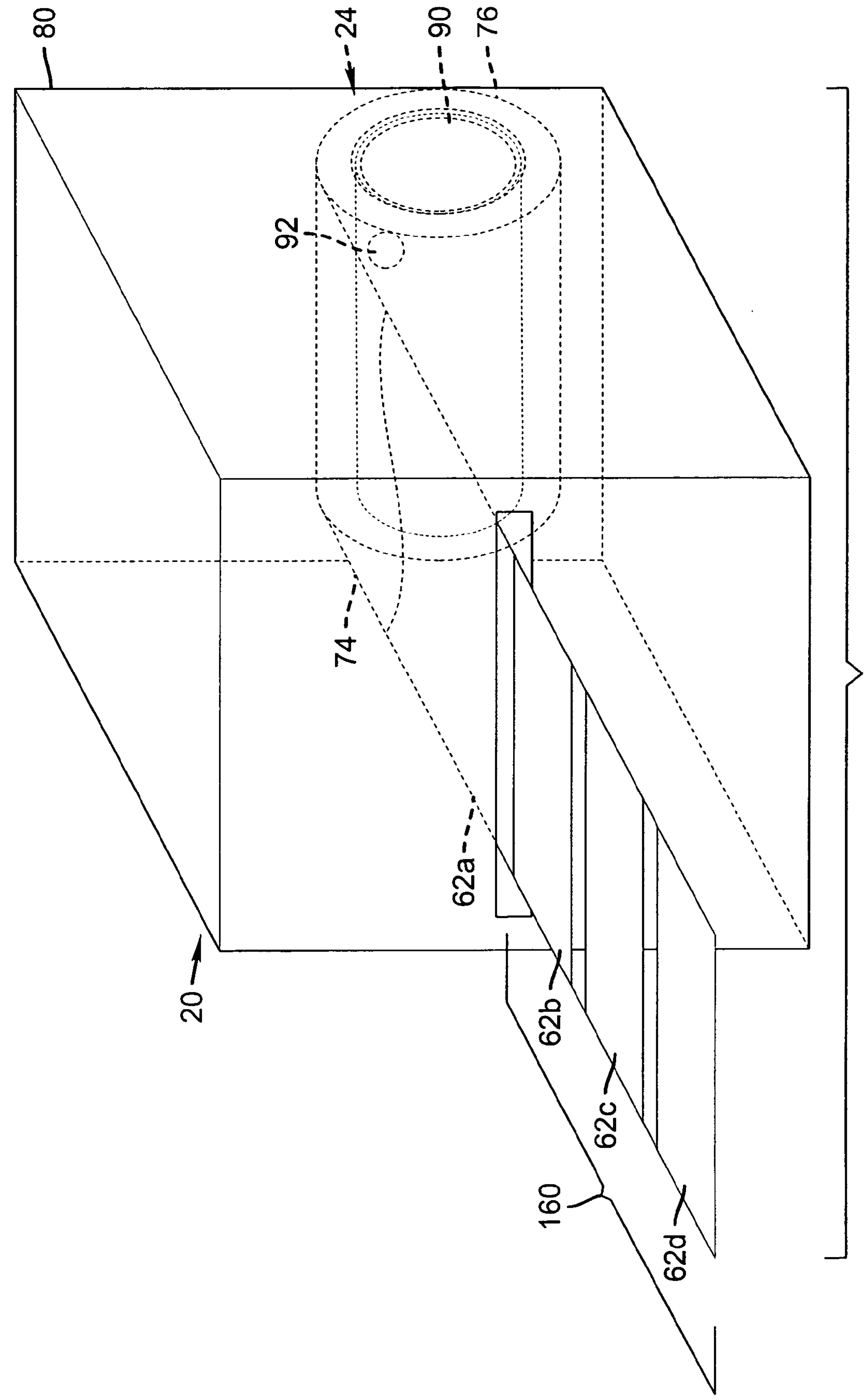
FIG. 5 shows an embodiment of a receiver medium storage area.
Figure 6:
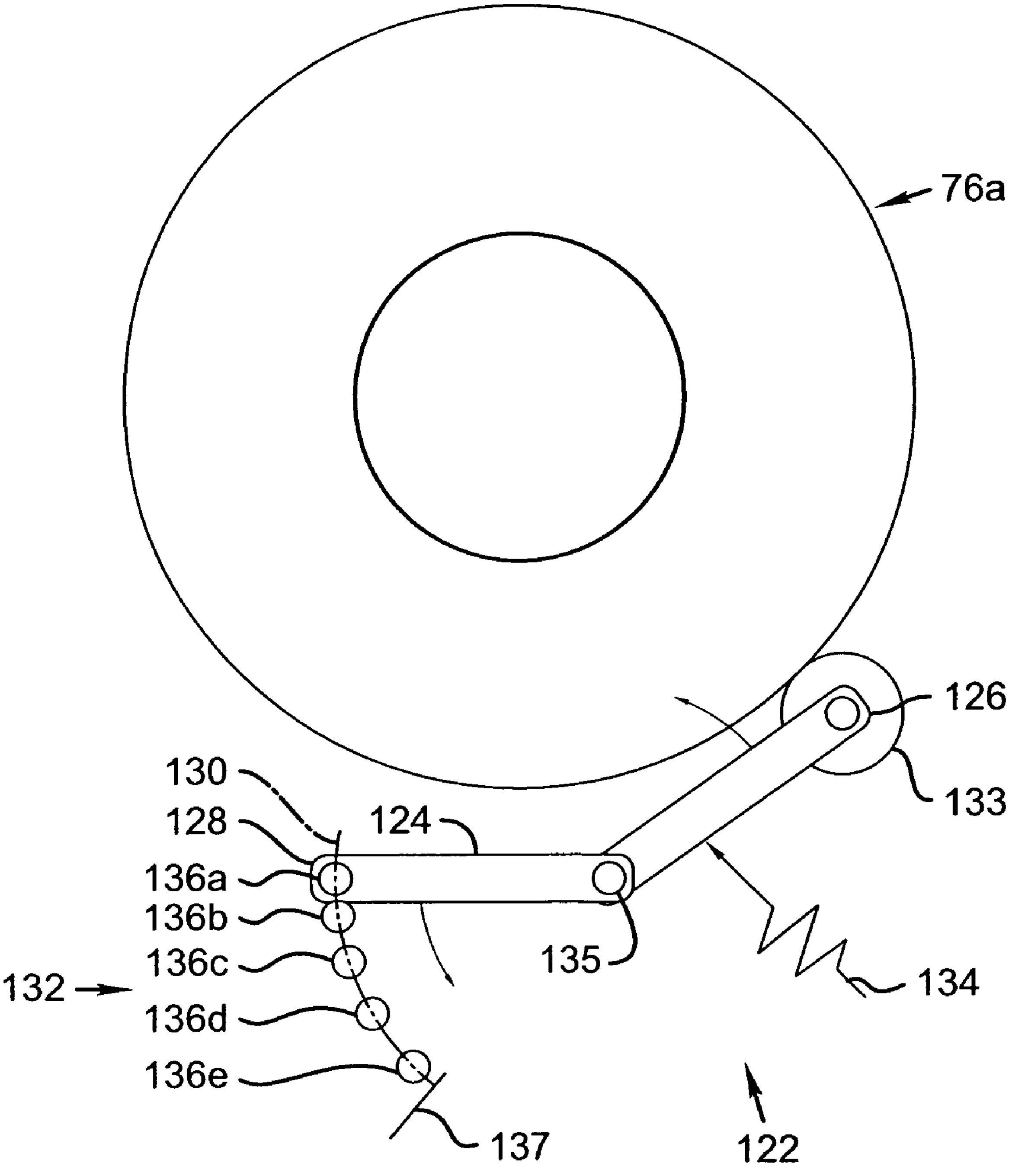
FIGS. 6-10 illustrate the operation of one embodiment of a receiver medium sensor.

In another embodiment illustrated in FIG. 5, receiver medium storage area 80 can comprise a shaft 90 onto which rolled portion 72 of receiver medium 24 is loaded and a shaft switch 92 positioned on shaft 90 so that shaft switch 92 will be actuated either by the act of removing rolled portion 72 of receiver medium 24 from shaft 90 or by the act of loading rolled portion 72 of receiver medium 24 onto shaft 90. In the example, shaft switch 92 is located at a position shaft 90 in a manner that causes shaft switch 92 to be closed whenever a rolled portion 72 is loaded onto shaft 90. In this embodiment, a processor 34 determines that there is a possibility that a receiver medium 24 may have been contacted by detecting a pattern of signals from shaft switch 92 indicating that a rolled portion 72 of receiver medium 24 has been loaded.

In another embodiment, processor 34 and sensors 38 can cooperate to detect errors that can occur during operation of printer 20 and that suggest that a receiver medium 24 may have been manipulated to correct an error condition. For example, processor 34 and sensors 38 can detect error conditions suggesting that a "jam" has occurred in medium advance 26 preventing receiver medium 24 from freely moving within the medium advance 26. Where such conditions are detected, processor 34 typically causes a signal to be sent advising a user to contact the receiver medium to clear the "jam". Accordingly, when processor 34 receives signals from sensors 38 that detect such "jams" that alternately indicate that a "jam" exists and that the "jam" has subsequently been corrected, processor 34 can determine that it is possible that receiver medium 24 may have been contacted. There are of a variety of sensors 38 and control strategies that are known in the art and that can be applied for the purpose of sensing so-called jam conditions, any one of which can be applied for this purpose.

It will be appreciated that, depending upon the design of printer 20, the uses to which printer 20 is put and the type of receiver medium 24 that is used, there may be a variety of additional conditions that can be sensed by sensors 38 that may indicate to processor 34 that there is a possibility that receiver medium 24 has been contacted including, but not limited to, a signal indicating that a roll of receiver medium is fully used or a signal indicating that donor material has been replaced or has escaped contamination.

An aspect of receiver medium 24 indicative of the circumferential length of receiver medium is then measured (step 102). The measured aspect can be any of a number of characteristics of the rolled portion 72 of receiver medium 24. A receiver medium sensor 122 is used to measure the aspect of receiver medium 24.

Figure 10:
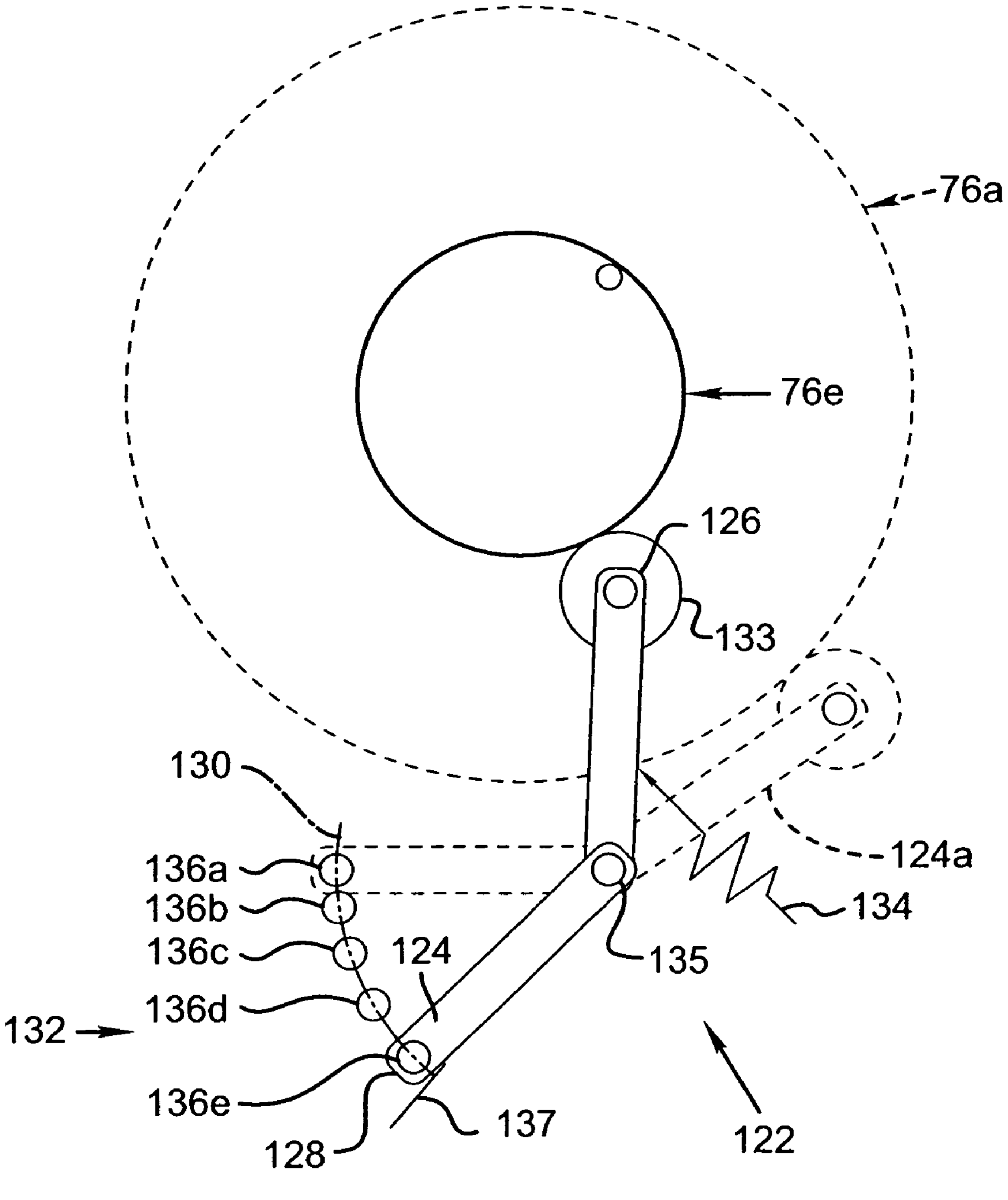

FIGS. 6-10 illustrate one example of a receiver medium sensor 122 that is capable of measuring an aspect of rolled portion 72 of receiver medium 24 that is indicative of the circumferential length of outermost layer 76 of receiver medium 24. In this embodiment, receiver medium sensor 122 comprises a lever arm 124 biased by a biasing member 134 such as a spring about a pivot 135 so that a first end 126 is held against receiver medium 24. In this embodiment, a resilient roller 133 provides a low friction engagement surface that allows contact with outermost layer 76 of rolled portion 72. A second end 128 of lever arm 124 is positioned for movement along an arcurate path 130 beginning at a full position illustrated in FIG. 6 that the second end 128 is moved into when the first end 126 is biased against an outermost layer 76*a* of a rolled portion 72 of receiver medium 24 that has not yet been used and continuing through a range of positions illustrated, for example, in FIGS. 7, 8 and 9 to exhausted position illustrated in FIG. 10 that second end 128 is moved into when first end 126 is biased against when receiver medium 24 is exhausted. As is illustrated in FIG. 10, an optional stop 137 prevents further biased movement of lever arm 124 when lever arm 124 is at the exhausted position. For comparison, purposes a phantom outline is provided in FIGS. 7-10 depicting the positions of lever arm 124 and the outermost layer 76*a*-76*e* of rolled portion 72 of receiver medium 24.

Figure 7:
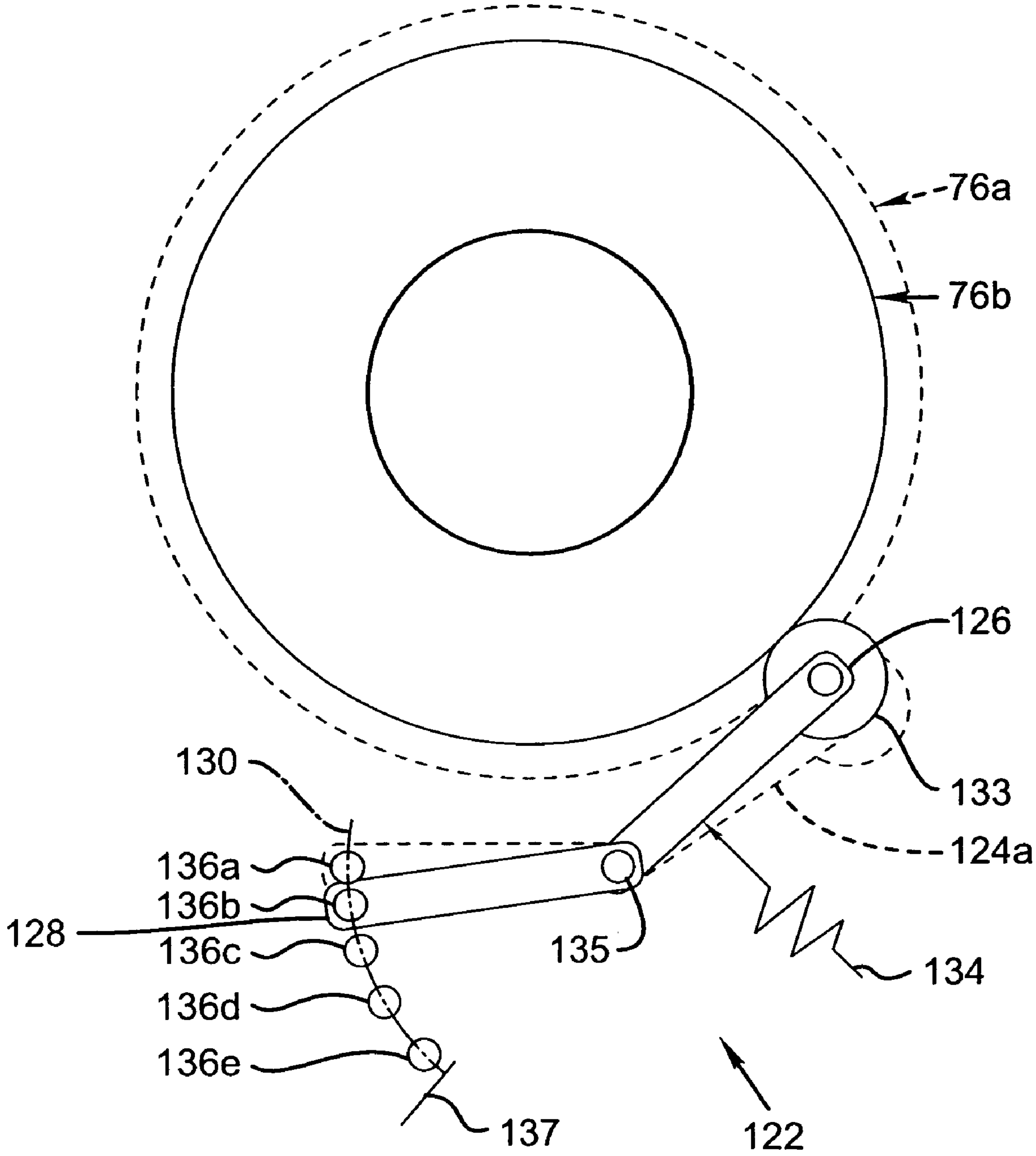
Figure 8:
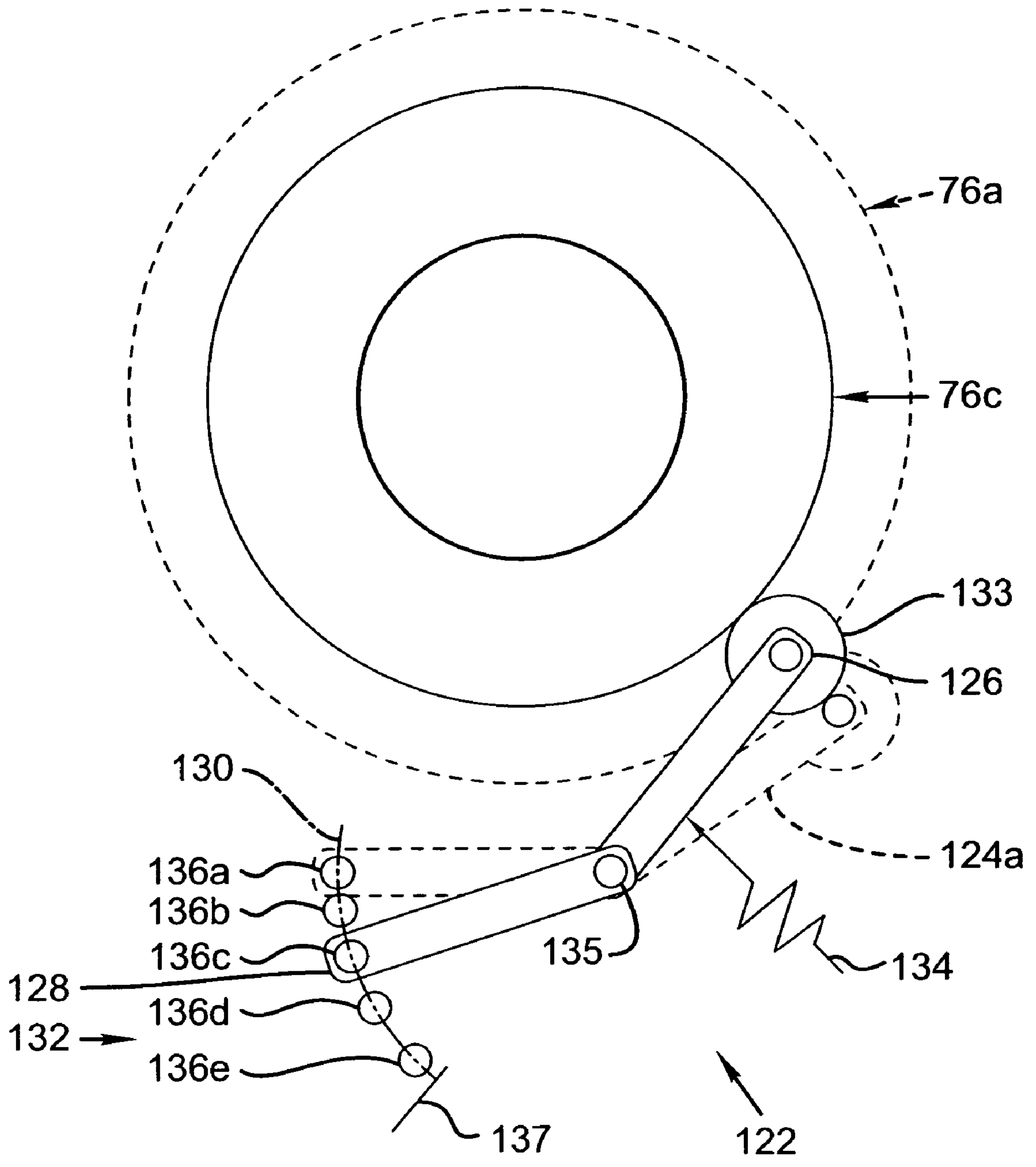
Figure 9:
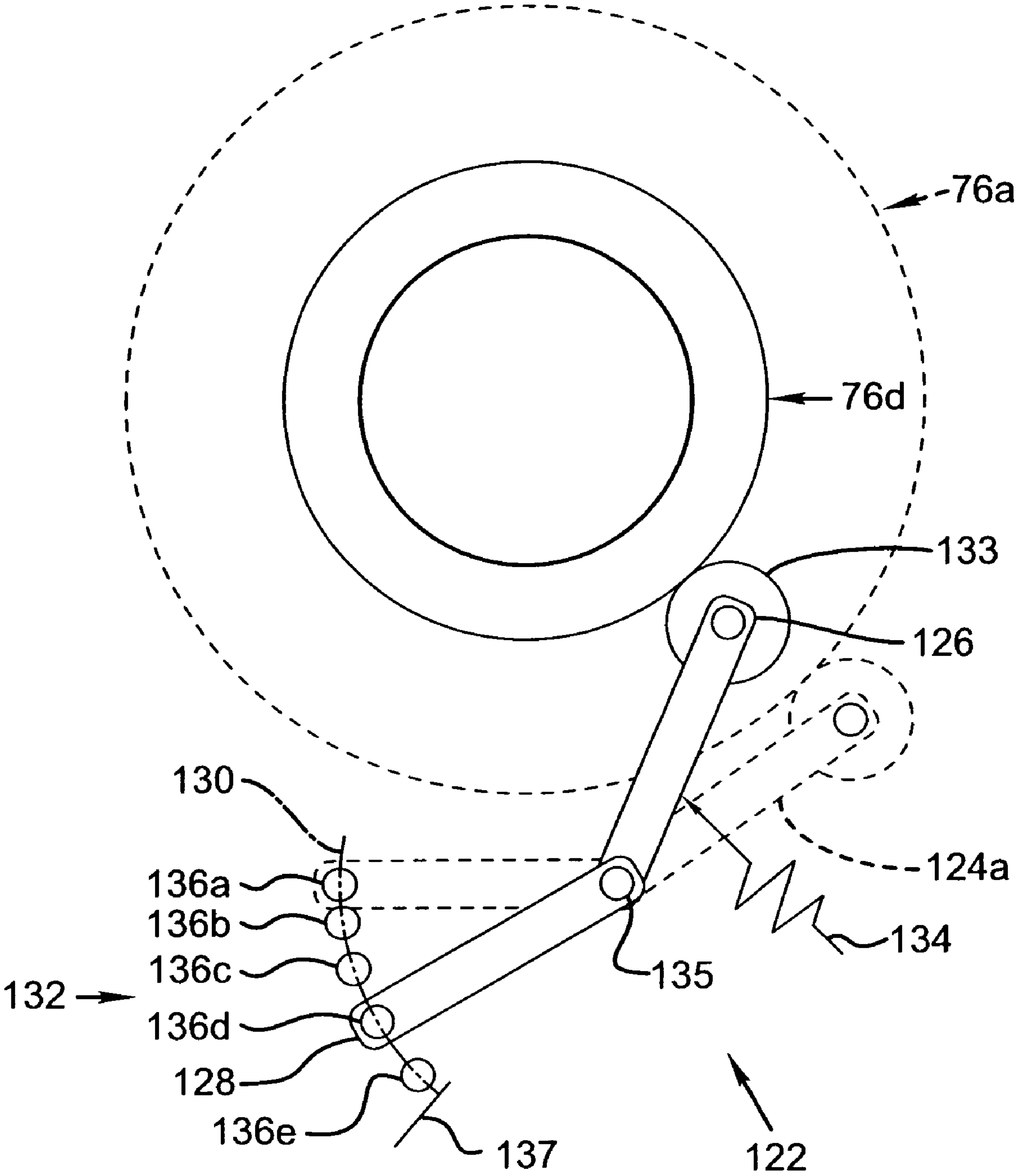

As is illustrated in FIGS. 6-10, a position sensor system 132 is provided and is capable of generating signals that can be used by processor 34 to determine the position of second end 128 relative to the exhausted position (FIG. 11) or the unused position (FIG. 7). In the embodiment of FIGS. 6-10, position sensor system 132 comprises a plurality of individual second end sensors 136*a*-136*f*, such as switches or electrical contacts, within arcurate path 130, each second end sensor 136*a*-136*f* being located at a position that is associated with a different range of circumferential lengths of receiver medium 24 and each being adapted to provide a signal to processor 34 when second end 128 is proximate thereto. Signals from position sensor system 132 are then provided to processor 34.

Figure 11:
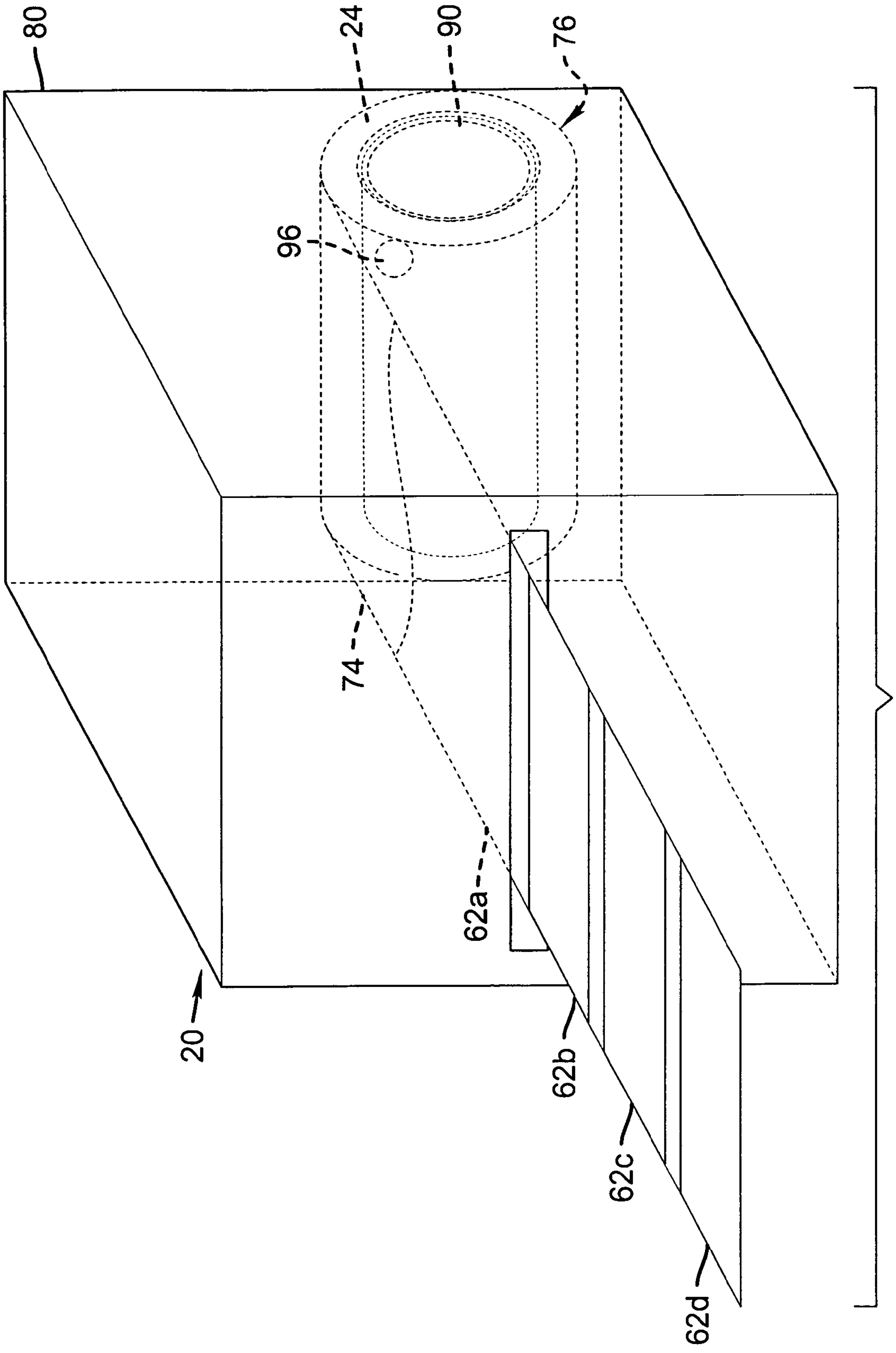
FIG. 11 illustrates another embodiment of a receiver medium sensor.

In still another alternative embodiment illustrated in FIG. 11, receiver medium sensor 122 can comprise a weight sensor 96 that is positioned on a shaft 90 on which rolled portion 72 of receiver medium 24 is loaded. Weight sensor 96 is adapted to detect a weight of rolled portion 72 and to provide a signal to processor 34 from which processor 34 can determine a circumferential length thereon and from this can determine a circumferential length of outermost layer 76 of the rolled portion 72 of receiver medium 24. The receiver medium sensor 122 can be adapted to measure distance from the outermost layer 76 of a rolled portion 72 of receiver medium 24 to a fixed point in the printer 20 proximate to area 80 for receiving rolled portion 72 of receiver medium 24. It will be appreciated that weight sensor 96 can also perform the function of shaft switch 92.

Figure 12:
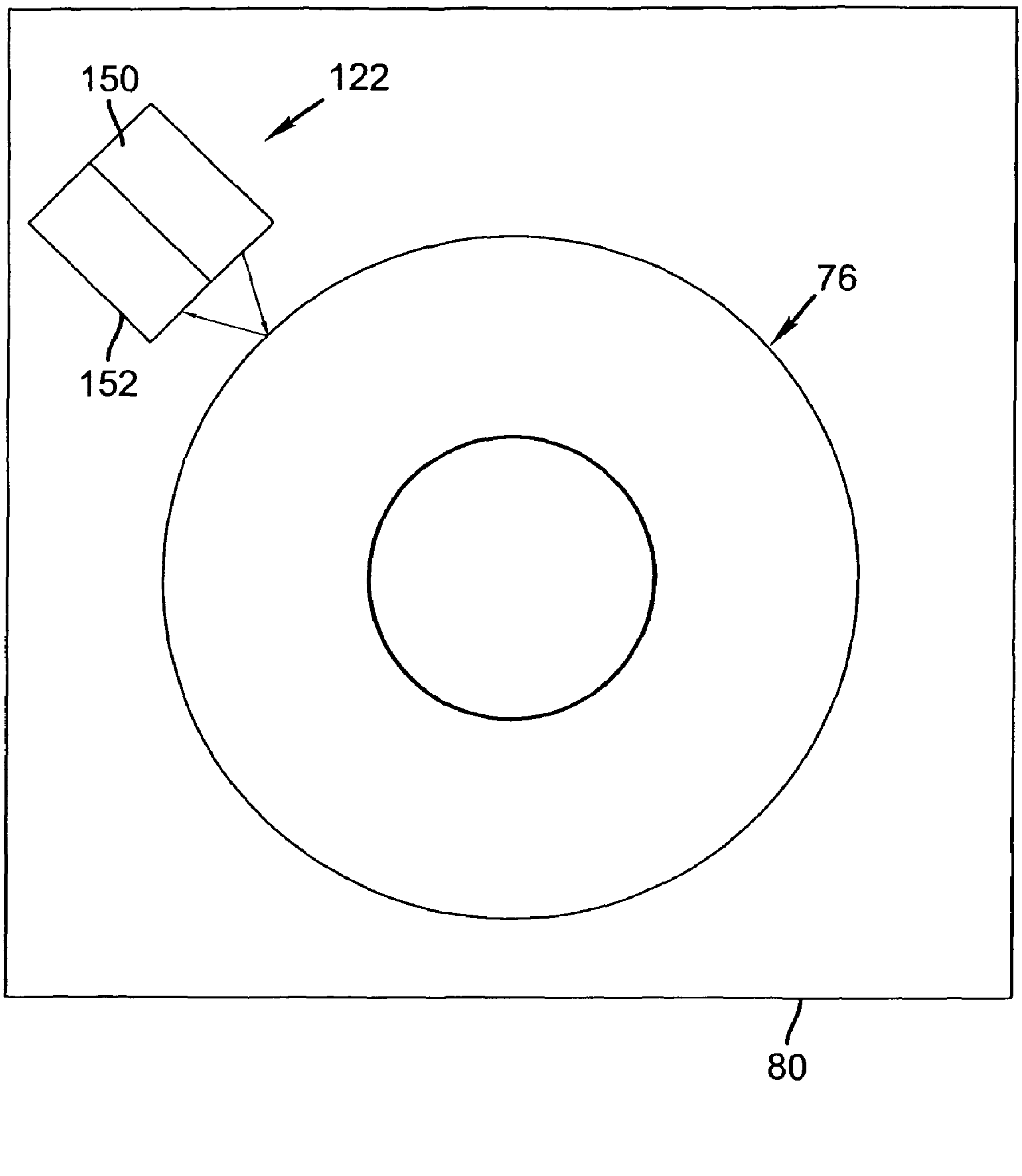
FIG. 12 illustrates another embodiment of a receiver medium sensor.

One example embodiment of this type is illustrated in FIG. 12, in which the receiver medium sensor 122 comprised an optical or sonic sensor having an emitter 150 and a sensor 152 positioned in receiver medium storage area 80 and directed from a fixed portion thereof onto the outermost layer 76. The emitter 150 generates a first optical or sonic signal, while the sensor 152 receives a reflected portion thereof, and provides a signal indicative the magnitude of the reflected portion, the magnitude of the reflected portion being indicative of a distance from the receiver medium sensor 122 to the outermost layer 76.

Processor 34 then determines a circumferential length of the rolled portion 72 of receiver medium 24 (step 104). This determination is made based upon the measured aspect of the rolled portion 72 of receiver medium 24. Typically, this determination can be made based upon a look up table or other preprogrammed logical association between the measured aspect and the circumferential length. However, the circumferential length can also be calculated by processor 34 using geometric equations where the measured aspect of the outermost layer of the rolled portion 72 of receiver medium 24 is amenable for use in such equations.

Processor 34 then selects an exclusion length 160 (step 106) for the receiver medium 24 based upon the determined circumferential length (step 104). Exclusion length 160 can be equal to the circumferential length or it can be longer.

It will be appreciated that unrolled portion 74 receiver medium 24 travels along a path of some length from rolled portion 72 and that to advance all of receiver medium 24 past print engine 22, it is necessary to advance the determined circumferential length plus a distance that represents the distance from the rolled portion 72 to print engine 22. This is, of course, generally a distance that can be determined based upon the length of the unrolled portion 74 of receiver medium 24. Accordingly, the exclusion length can be established to include a length that corresponds to the length of unrolled portion 74 plus the determined circumferential length.

The exclusion length 160 can be measured in any of a variety of ways. In the embodiment illustrated in FIGS. 13 and 14, exclusion length 160 is shown as being measured in units of image frames 62*a*-62*g*.

Receiver medium 24 is then advanced by the exclusion length (step 108) so that any portion of receiver medium 24, that might have been contacted, is moved past print engine 22 so that such portions will not be used for printing.

Figure 13:
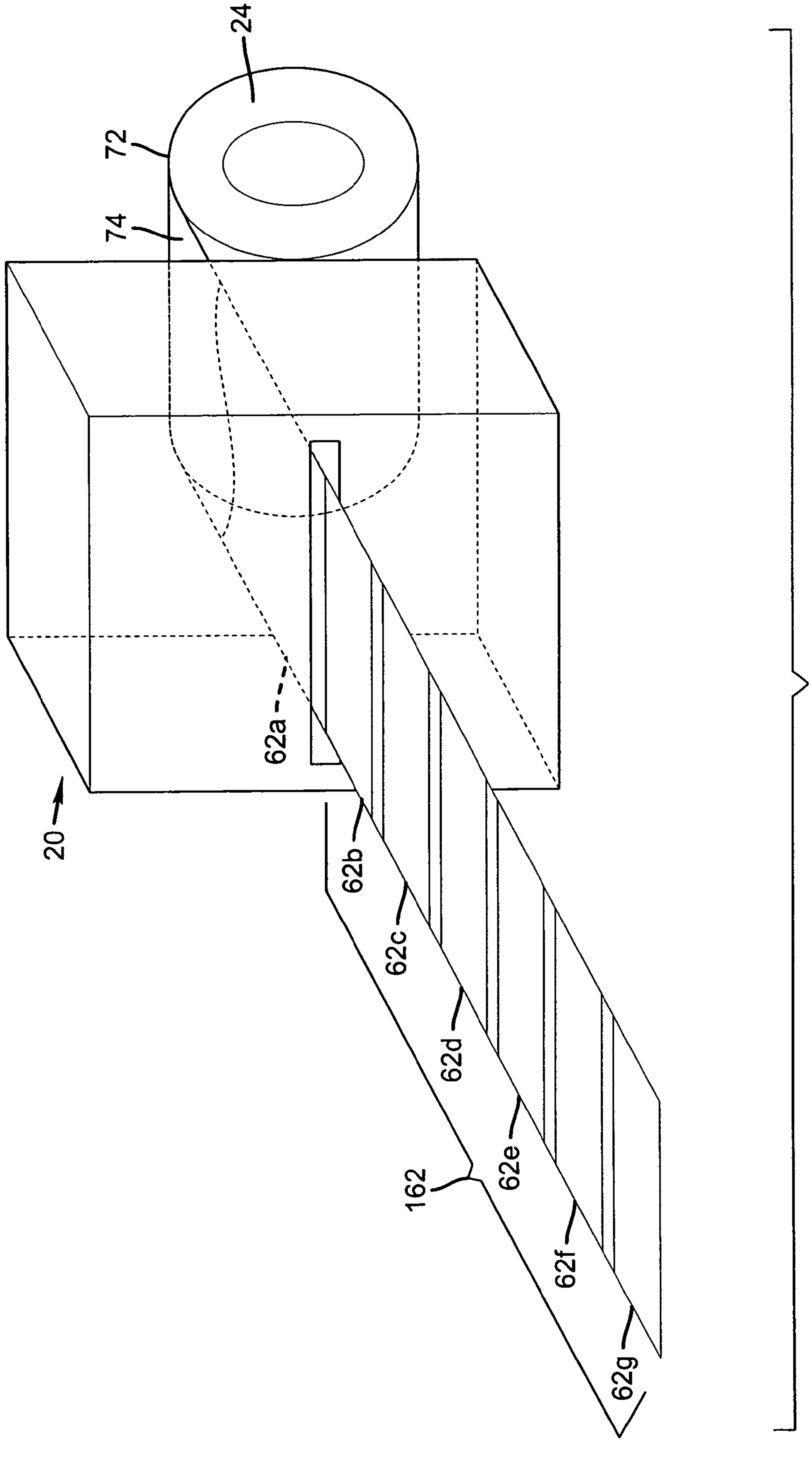
FIGS. 13 and 14 illustrate another embodiment of a printer.
Figure 14:
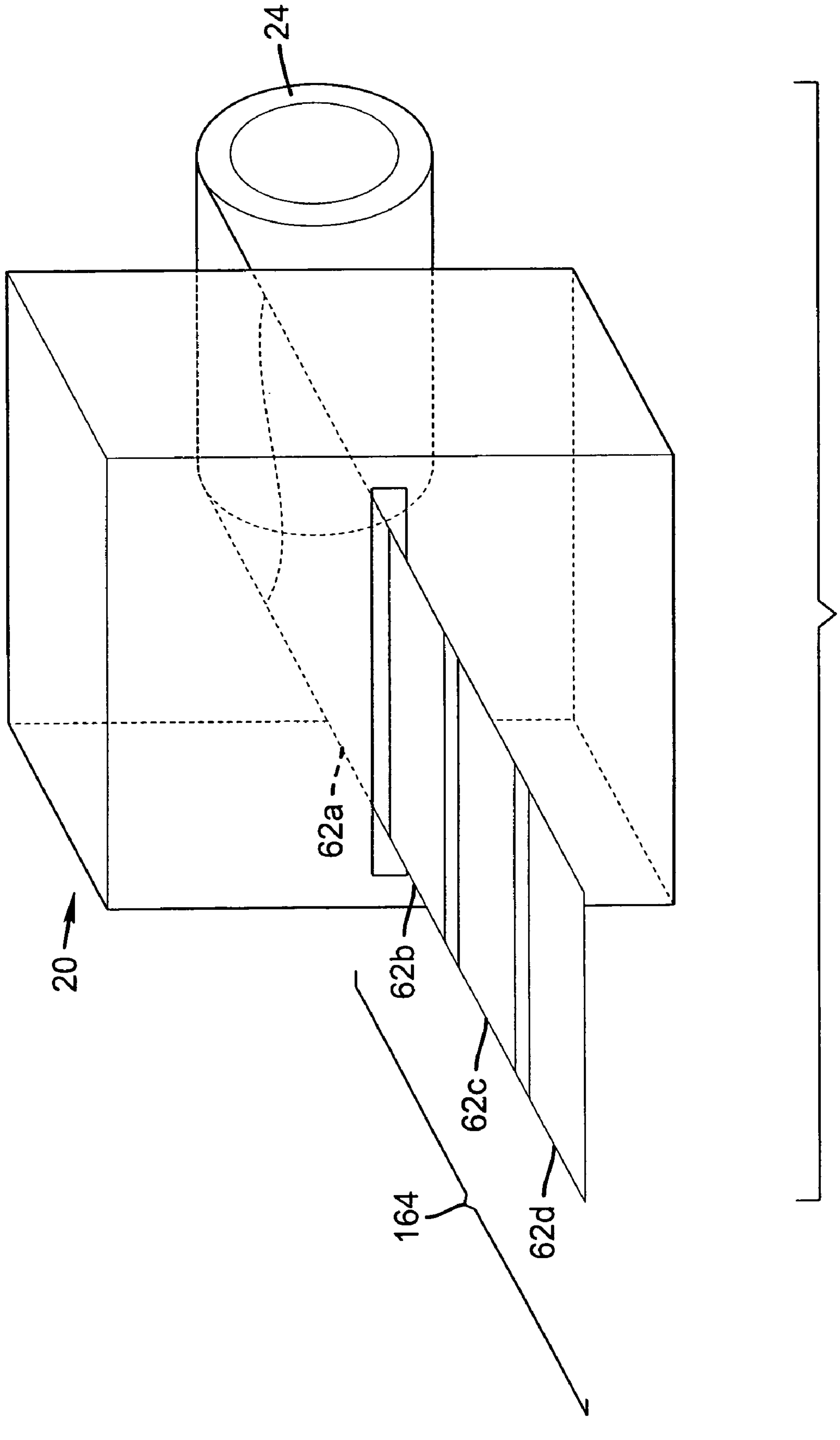

Accordingly, when an unused roll 14*a* of receiver medium 24 is loaded into printer 20 as illustrated in FIG. 13, processor 34 will determine a first exclusion length 162 that extends for five image frames 62*a*-62*e*. However, processor 34 will determine a second exclusion length 164 that extends for only 3 image frames when a used roll 14*b* of receiver medium 24 is loaded into printer 20. In other embodiments, an exclusion length can be determined using other units of receiver medium advance The invention has been described in detail with particular reference to certain preferred embodiments thereof, but it will be understood that variations and modifications can be effected within the spirit and scope of the invention.

PARTS LIST

10 prior art printer
12 receiver medium
14*a* unused roll
14*b* used roll
16*a*-16*f* image frames
18*a*, 18*b* circumference

20 printer
21 housing
22 print engine
24 receiver medium
26 medium advance
28 motor
30 pinch rollers
34 processor
36 user input system
38 sensors
40 memory
42 hard drive
44 removable disk drive
46 memory card slot
48 removable memory
50 memory interface
52 remote memory system
54 communication system
56 remote display
58 remote input
58*a* remote keyboard
58*b* remote mouse
58*c* remote control
62*a*-62*e* image frame
64 image
66 local display
68 local user input
68*a* local keyboard
68*b* local mouse
72 rolled portion of receiver medium
74 unrolled portion
76 outermost layer
76*a*-76*e* outermost layer
80 receiver medium storage area
82 enclosure area
84 door
86 door sensor
90 shaft
92 shaft switch
96 weight sensor
100 detect condition step
102 measure aspect step
104 determine circumferential step
106 determine exclusion length step
108 advance receiver medium step
122 receiver medium sensor
124, 124*a* lever arm
126 first end
128 second end
130 arcurate path
132 sensor system
133 roller
134 biasing member
135 pivot
136*a*-136*f* second end sensor
137 stop
150 emitter
152 sensor
160 exclusion length
162 first exclusion length
164 second exclusion length
L prior art fixed exclusion length

The invention claimed is:

1. A method for operating a printer that prints using a receiver medium comprising a rolled portion having layers of rolled receiver medium leading to an outermost layer from which an unrolled portion of the receiver medium extends to a print engine; the method comprising the steps of:

sensing a condition indicating that the receiver medium may have been contacted other than by a component of the printer or by a donor material applied by a print engine of the printer;

measuring an aspect of the rolled portion of the receiver medium indicative of the circumferential length of the outermost layer of the rolled portion of the receiver medium;

determining a circumferential length of the rolled portion of the receiver medium based upon the measured aspect of the rolled portion of the receiver medium;

determining an exclusion length of the receiver medium based upon the determined circumferential length and a travel distance that is a representation of a length of the unrolled portion from the rolled portion to the print engine; and automatically advancing the receiver medium by the exclusion length so that a subsequent image printed by the printer will be printed using a portion of the receiver medium that was not directly subject to the possibility of such contact.

2. The method of claim 1, wherein the measured aspect comprises a circumference of the rolled portion of the receiver medium.

3. The method of claim 1, wherein the measured aspect comprises a distance from the outermost layer of the receiver medium to a fixed point in the printer relative thereto.

4. The method of claim 1, wherein the measured aspect comprises a distance from an axis upon which the rolled portion of the receiver medium is loaded to the outermost layer.

5. The method of claim 1, wherein the exclusion length of the receiver medium is determined in terms of unit lengths of the receiver medium with each unit length being associated with a length of the receiver medium that is used for printing an image frame.

6. The method of claim 1, further comprising the step of excising the portions of the receiver medium that were advanced.

7. The method of claim 1, wherein the measured aspect comprises a radius of the rolled portion of the receiver medium or a diameter of the rolled portion of the receiver medium.

8. The method of claim 1, wherein the condition indicating that the roll of receiver medium in the printer may have been contacted comprises a condition that indicates that a receiver medium has been loaded into the printer.

9. The method of claim 1, wherein the condition indicating that a receiver medium that is loaded in the printer may have been contacted comprises an error condition of a type that is likely to require manipulation of the receiver medium to resolve the error condition.

10. The method of claim 1, wherein the condition indicating that a receiver medium may have been contacted comprises a detected condition indicating that a printer enclosure for the receiver medium has been opened.

11. A printer comprising:

a medium advance including a roll receiving area for receiving a rolled portion of a receiver medium having a preferred side for use in recording images during printing and a receiver medium path leading to a print engine, said receiver medium being rolled so that the preferred side faces outward of the roll, said medium advance having a motorized system for advancing an unrolled portion of the receiver medium away from the rolled portion to a print engine that is adapted to use the preferred side for recording images;

a sensor system having a receiver medium sensor located at the roll receiving area and adapted to provide signals from which a processor can determine a circumferential length of the rolled portion of the receiver medium and said sensor system further having a sensor adapted to detect at least one condition indicating that a possibility exists that the preferred side of the receiver medium has been in contact other than with a component of the printer or a print engine applied donor material, said sensor system generating a signal that can be used to determine when a possibility exists that the preferred side of the receiver medium has been in contact with something other that a component of the printer or a donor material applied to the print engine; and said processor operatively connected to the receiver medium transport system, the print engine and the sensor system, said processor being adapted to determine from signals provided by the sensor system when a condition exists suggesting that there may have been contamination of the receiver medium and, when such a condition is detected, said processor further being operable to determine a circumferential length based upon signals received from the receiver medium sensor to select an exclusion length of receiver medium based upon the determined circumferential length, and a length representing a length of the unrolled portion from the rolled portion to the print engine; and to cause the receiver medium transport system to advance the receiver medium by at least the exclusion length so that portions of the receiver medium that have potentially been contacted are excluded from printing;

wherein said selected non-printing length is proportional to the measured aspect of the receiver medium.

12. The printer of claim 11, wherein a plurality of second end sensors are provided within the arcurate path, each sensor being located at a position that is associated with a different range of circumferential lengths of the receiver medium and wherein said processor selects an exclusion length of the receiver medium based upon which one of the position sensors detects the second end.

13. The printer of claim 11, wherein the receiver medium sensor comprises an optical or sonic sensor positioned in the receiver medium receiving area and directed from a fixed portion thereof onto the outermost layer, said receiver medium sensor being adapted to generate a first optical or sonic signal, to receive a reflected portion thereof, and to provide a signal indicative the magnitude of the reflected portion, said magnitude being indicative of a distance from the optical or sonic sensor to the outermost layer.

14. The printer of claim 11, wherein said receiver medium receiving area comprises an enclosure with an opening, and wherein said printer further comprises an enclosure sensor adapted to detect when the opening has been opened and generating a signal from which the processor can determine that a condition exists that may indicate that the receiver medium may have been contacted.

15. The printer of claim 11, wherein said printer comprises a shaft onto which the rolled receiver medium is loaded and a switch positioned on the shaft so that the switch will generate a signal when the roll of receiver medium is removed from the shaft or loaded onto the shaft, and wherein the processor uses the signal.

16. A printer comprising:

a receiver medium transport system including a roll receiving area for receiving a rolled portion of a receiver medium having a preferred side for use in recording images during printing and a receiver medium path leading to a print engine, said receiver medium being rolled so that the preferred side faces outward of a spool, said receiver medium transport system having a motorized system for advancing an unrolled portion of the receiver medium away from the rolled portion to a print engine that is adapted to use the preferred side for recording images;

a sensor system having a receiver medium sensor located at the roll receiving area and adapted to provide signals from which a processor can determine a circumferential length of the rolled portion of the receiver medium currently rolled onto the loaded spool;

a sensor adapted to detect at least one condition indicating that a possibility exists that the exposed side of the receiver medium has been in contact other than with a component of the printer or a print engine applied donor material, said sensor generating a signal from which a processor can determine the existence of such a possibility of contact; and said processor operatively connected to the receiver medium transport system, the sensor system, the print engine and the receiver medium sensor, said processor being adapted to determine when a condition exists suggesting that the receiver medium may have been contacted and, when such a condition is detected, said processor further being operable to determine a circumferential length of the rolled portion based upon signals received from the receiver medium sensor to select an exclusion length of receiver medium based upon the assigned circumferential length designation; and to cause the receiver medium transport system to advance the receiver medium in a manner that excludes from printing a length of the receiver medium beginning at a point of the receiver medium confronting the print engine and extending at least by the exclusion length of the receiver medium;

wherein said selected exclusion length is proportional to the measured aspect of the receiver medium.

17. The printer of claim 16, wherein the detection system detects at least one of a replacement of a donor supply, a roll of receiver medium or a printer error condition possibly requiring manipulation of the receiver medium.

* * * * *

UNITED STATES PATENT AND TRADEMARK OFFICE
CERTIFICATE OF CORRECTION

PATENT NO. : 7,907,290 B2
APPLICATION NO. : 11/317922
DATED : March 15, 2011
INVENTOR(S) : Robert Frederic Mindler et al.

It is certified that error appears in the above-identified patent and that said Letters Patent is hereby corrected as shown below:

| Column | Line | |
|---|---|---|
| 11 | 37 | In Claim 12, delete "arcurate" and insert -- arcuate --, therefor. |
| 11 | 49 | In Claim 13, delete "indicative the" and insert -- indicative of the --, therefor. |

Signed and Sealed this
Twenty-sixth Day of July, 2011

David J. Kappos

David J. Kappos
*Director of the United States Patent and Trademark Office*